(88.)

2 Sheets--Sheet 1.

A. G. BATCHELDER.

Improvement in Fruit Paring Machines.

No. 122,305.

Patented Jan. 2, 1872.

Witnesses.
S. N. Piper.
L. N. Möller.

A. G. Batchelder
by his attorney
R. H. Eddy

AM. PHOTO-LITHOGRAPHIC CO. N.Y. (OSBORNE'S PROCESS.)

(88.)
2 Sheets--Sheet 2.
A. G. BATCHELDER.
Improvement in Fruit Paring Machines.
No. 122,305.
Patented Jan. 2, 1872.
Fig. 8.
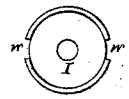
Fig. 11.
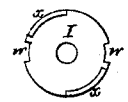
Fig. 9.
Fig. 7.
Fig. 10.
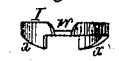
Fig. 4.
Fig. 12.
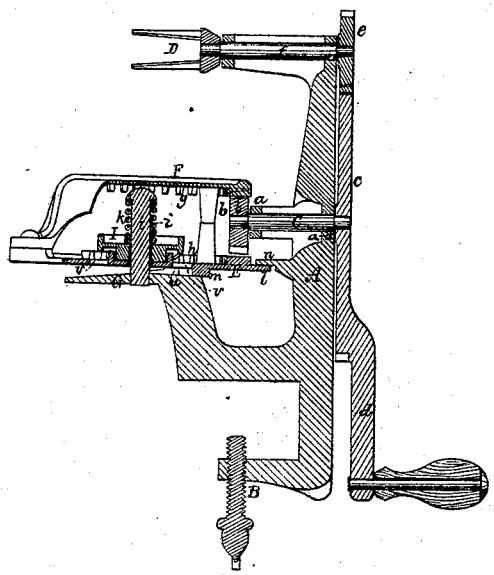
Witnesses
S. N. Piper
L. N. Moller
A. G. Batchelder
by his attorney

UNITED STATES PATENT OFFICE.

ASAHEL G. BATCHELDER, OF LOWELL, MASSACHUSETTS.

IMPROVEMENT IN FRUIT-PARING MACHINES.

Specification forming part of Letters Patent No. 122,305, dated January 2, 1872.

*To all persons to whom these presents may come:*

Be it known that I, ASAHEL G. BATCHELDER, of Lowell, of the county of Middlesex and State of Massachusetts, have invented a new and useful Improvement in Fruit-Paring Machines; and do hereby declare the same to be fully described in the following specification and represented in the accompanying drawing, of which—

Figure 1:
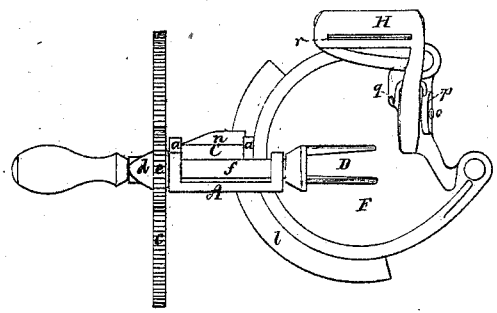
Figure 2:
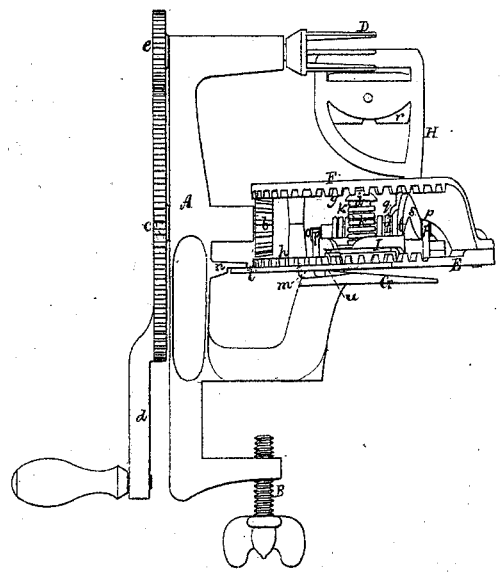
Figure 3:
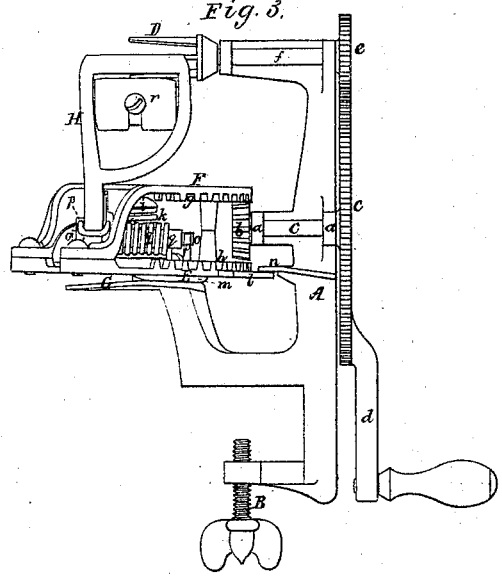

Figure 1 is a top view; Figs. 2 and 3, opposite side elevations; and Fig. 4, a vertical section; and Fig. 12, a front elevation of my improved apple or fruit-parer. The remaining figures, to and inclusive of that marked 11, will be hereinafter referred to and described.

My improvement has reference to mechanism for operating the cutter-carrier.

Figure 5:
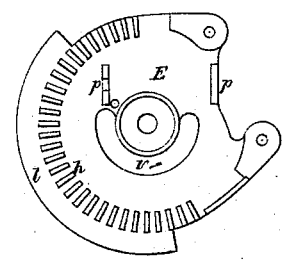
Figure 6:
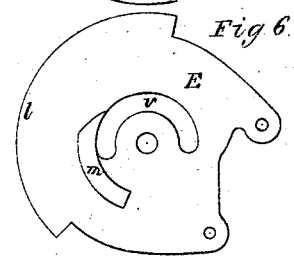

In the drawing, A denotes the frame of the machine, it being provided with a clamp-screw, B, for fixing it to a bench or table. This frame supports, in proper bearings $a\ a$, a driving-shaft, C, furnished at its inner end with a beveled pinion, $b$. The said shaft C also has a spur-gear, $c$, fixed on it, which is provided with a crank, $d$. The gear $c$ engages with a pinion, $e$, fixed on the rotary fork-shaft $f$, arranged at the upper part of the frame. The fork for supporting and revolving the apple or fruit or vegetable to be pared is shown at D. The beveled pinion $b$ extends between the ranges $g\ h$ of teeth of two beveled sectors, E F, which are connected together and arranged as represented, the upper of such sectors being a solid or unperforated plate or guard arranged to cover the mechanism underneath it in a manner to protect it from parings that may be separated by the knife and be likely to drop into the space between the two sectors. The lower sector E rests on an inclined base, G, and turns loosely on a pivot or pin, $i$, extended up from such base, which constitutes part of the frame A. A helical spring, $k$, encircles the pivot or pin, $i$, and rests against its head and presses downward upon the sector E. There projects from the periphery of the sector E an arcal lip, $l$, formed as represented, and particularly in Fig. 5, which is a top view of the said lower sector, a bottom view of it being shown in Fig. 6. There is a cam, $m$, on the bottom of the sector E. There is also a projection, $n$, extended from the frame A in manner as shown.

The knife-carrier or lever is seen at H, its fulcrum being shown at $o$ as resting in bearings or standards $p\ p$ erected on the sector E. The spring for forcing the knife-carrier to a fruit when on the fork is shown at $g$. It encompasses the said fulcrum, and at one end is fixed to or inserted in the sector, and at the other end is hooked around the knife-carrier. The knife is shown at $r$ as fixed in the carrier, a side view of the carrier being represented in Fig. 7. The shorter arm $s$ of the carrier has a tooth, $t$, projected down from it to operate with the knife-carrier elevator I, and with a stud, $u$, the latter being extended upward from the base G through a curved slot, $v$, made in the lower sector E. A top view of the knife-carrier elevator I is shown in Fig. 8, and opposite side views of it in Figs. 9 and 10. It turns freely on the pin $i$, and has two notches, $w\ w$, made in its periphery on opposite sides thereof. Furthermore it has two angular stop-cams, $x\ x$, extending from it, and formed as shown in Figs. 9 and 10, and also in Fig. 11, which is a bottom view of such part I.

If we suppose the fork to be supplied with an apple and the knife to be in a position to commence the paring operation thereon, the beveled pinion $b$ will be in engagement with the teeth of the lower sector E. On the crank being revolved the two sectors will be simultaneously revolved in one direction, and the arcal lip $l$ will pass over and upon the projection $n$. While the sectors are thus in movement so as to carry the knife-carrier about the apple from stem to eye thereof, the cam $m$ of the lower sector will meet and ride upon the base G so as to force upward the sectors against the pressure of the spring on their pivot. As soon as the arcal lip may pass off the bearing $n$ both sectors, by the pressure of the spring and by the cam resting on the part G, will be moved downward so as to throw the sector E out of engagement with the beveled pinion and the sector F into engagement with it. The pinion, continuing to be revolved in the same direction as before, will next, by its action on the teeth of the upper sector, cause a counter or reversed rotary motion of both sectors, thereby causing the knife-carrier to be moved back to the position for commencing the paring operation. During the counter or return movement of the sectors, as mentioned, the arcal lip will pass underneath the bearing n, and as soon as the lip may have passed the bearing the spring k will again tip the sectors, so as to throw the lower of them again into engagement with the pinion. Thus reciprocating rotary motions will be imparted to the sectors during a continued rotary motion of the pinion in one direction. When the lower sector is thrown into engagement with the pinion the tooth t of the knife-carrier will come over one of the notches w w of knife-carrier elevator I, in order to allow the knife to be sprung forward up to the fruit. During the advance of the knife around the fruit to pare it the rotary elevator I will be revolved one hundred and eighty degrees of a circle, one of its cammed stops or stop-cams being carried over and beyond the stationary stud u of the base G. During the next rotary movement of the sectors the stud u and the cammed stop will arrest all rotary movement of the elevator I, and as a consequence the said elevator will serve as a cam to effect with the tooth t the outward movement of the knife-lever on its bearings, while the said lever may be in the act of being carried back to the point of commencing to pare the fruit. The outward movement of the lever is to take the knife out of the way of the fork sufficiently for the placing of a fruit on the latter. During each movement of the sectors to effect the paring of the apple by the knife the elevator I will be revolved through a half-circle, it being estopped, as before described, during the entire movement of the sectors.

In the said improved apple-parer I claim as my invention as follows, viz.:

I claim the mechanism or combination, substantially as described, which, with the beveled pinion, is for effecting the reciprocating rotary motions of the knife-carrier around the fork, or a fruit when in the latter, such mechanism consisting of the two toothed sectors, E F, the arcal lip l, the stationary projection n, the cam m, the base G, the pivot i, and the spring k, all combined and arranged in manner and to operate essentially as specified.

I also claim the mechanism or combination, substantially as described, for effecting the outward and inward movements of the knife-carrier during its rotary motions around the apple or its supporting fork, such mechanism consisting of the elevator I, the stationary stud u, the tooth t, and the spring g, all being arranged and combined together, and with the base G, the pivot i, the spring k, the lever H, essentially in manner and so as to operate as set forth.

I also claim the mechanism, as described, which with the beveled pinion is for effecting the reciprocating rotary motions of the knife-carrier around the fork, or a fruit when thereon, in combination, and arranged as set forth, with the mechanism, as explained, for effecting the outward and inward movements of the knife-carrier during its rotary motions around the apple or its supporting fork, all being as specified.

I also claim the combination and arrangement of a guard or cover F with the gear or sector E, said guard, as shown, making part of the gear or sector F.

ASAHEL G. BATCHELDER.

Witnesses:
ALANSON NICHOLS,
W. R. BATCHELDER. (88)